United States Patent [19]

D'Errico

[11] Patent Number: 4,992,861

[45] Date of Patent: Feb. 12, 1991

[54] COLOR IMAGE REPRODUCTION APPARATUS HAVING A DIGITALLY OPERATED LOOK-UP TABLE CONSTRUCTED BY MEANS OF A LEAST SQUARES ALGORITHM

[75] Inventor: John R. D'Errico, Rochester, N.Y.

[73] Assignee: Eastman Kodak Company, Rochester, N.Y.

[21] Appl. No.: 259,548

[22] Filed: Oct. 18, 1988

[51] Int. Cl.$^5$ .............................................. H04N 1/46
[52] U.S. Cl. ........................................ 358/75; 358/80
[58] Field of Search ...................... 358/75, 78, 80, 456, 358/457; 382/1, 54; 364/518, 521, 200, 900

[56] References Cited

U.S. PATENT DOCUMENTS

| | | | |
|---|---|---|---|
| 4,275,413 | 5/1981 | Sakamoto | 358/80 |
| 4,500,919 | 2/1985 | Schreiber | 358/78 |
| 4,654,720 | 3/1987 | Tozawa | 358/75 |
| 4,819,193 | 4/1989 | Imao | 358/80 |

FOREIGN PATENT DOCUMENTS 0050153  3/1986  Japan .................................... 358/80

Primary Examiner—Edward L. Coles, Sr.
Assistant Examiner—Jerome Grant
Attorney, Agent, or Firm—Dennis P. Monteith

[57] ABSTRACT

Color image reproduction apparatus, including a video monitor and a computer-based workstation, provides for modifying an original color image read from an input film and for writing a reproduced image on an output film. A plurality of digitally operated look-up tables (LUTs), associated with the workstation, serve for transforming original imaging data to a common color space (CIELUV L* u* v*) and for transforming reproduced imaging data to different use-dependent RGB color spaces, e.g. video monitor, output film, etc. Color image values stored in each LUT are altered from exact color image values by means of a least squares algorithm to provide an average error of zero—an unbiased error—for linearly interpolated values derived from each LUT.

2 Claims, 6 Drawing Sheets

COLOR IMAGE REPRODUCTION APPARATUS HAVING A DIGITALLY OPERATED LOOK-UP TABLE CONSTRUCTED BY MEANS OF A LEAST SQUARES ALGORITHM

BACKGROUND OF THE INVENTION

1. Field of the Invention

The present invention relates generally to transforming one or more independent variables to one or more dependent variables where a closed-form expression for each transform is not adequately known or, if known, is not useable practically due to its complexity. More particularly, the invention relates to color imaging apparatus that employs a least squares algorithm to construct a multi-dimensional look-up table for transforming imaging information between non-linearly related color spaces.

2. Description of the Prior Art

In the following description of relevant background art, reference is made to FIGS. 1(a) and 1(b), of the accompanying drawings, which illustrate a problem associated with interpolating linearly between neighboring values of a digitally operated look-up table defining a non-linear function.

Color image reproduction systems known in the art permit an operator to edit the color and composition of an original image to form a reproduced image. For example, U.S. Pat. No. 4,500,919 discloses an image reproduction system of one type in which an electronic reader scans an original color image, which may be in the form of a transparency or a print, and converts it to an electronic image. A computer workstation and an interactive operator interface, including a video display, permits an operator to edit the image displayed. When the operator has composed a desired image on the video display, the workstation causes an output writer device to make an inked output that is intended to match the reproduced image composed on the video display.

Imaging signals, for example signals corresponding to the primaries red (R), green (G), and blue (B), serve for driving the video display and the output writer devices used in the variety of color image reproduction systems known in the art. Each output imaging device, however, may require its own set of color signals, even though each set corresponds to the same colors, in order to account for differences in the color sensitivities of the different output imaging devices. For example, with a color image reproduction system that employs a film writer as an output device, the RGB color signals that drive the video display may be different from the RGB signals that drive the film writer. Moreover, to facilitate color correction, the computer itself may store color signals in a coordinate system that is device independent and relates to the perceptually relevant dimensions such as the Munsell value, hue, and chroma; the 1976 CIE color spaces CIELAB (L* a* b*) and CIELUV (L* u* v*); etc. Accordingly, the computer workstation is required to manipulate color signals, corresponding to the various images stored, produced and displayed, in a variety of coordinate systems.

In a computational sense, color correction requires the definition of multiple complicated functions in their respective color spaces (device dependent and independent) and the ability to transform or to map a set of color imaging data between one color space and a corresponding set of imaging data in one or more other color spaces. Color correction is a computationally expensive step because the various "color spaces" or coordinate systems used are related as complicated non-linear transformations between multiple variables that in some cases are not all independent of one another.

In more recently developed commercially available color image reproduction systems, color signals have been computer processed in digital form because of the high accuracy, speed, and flexibility that digital color correction can provide. To those ends, U.S. Pat. No. 4,346,402 teaches that color correction can be carried out by means of a digitally operated look-up table, referred to generally hereinafter as a LUT, for transforming color coordinate values from one color space to another color space.

To rival analog processing in flexibility, however, digital color correction must handle large digital data sets defining non-linear transformations. It can be appreciated by those skilled in the color imaging art that a brute-force LUT implementation requiring no on-line calculation for mapping from one color space to another would be prohibitive in computer storage space because, even with modern day memory devices, the number of data storage cells cannot be increased indefinitely.

One way to reduce the storage space that a LUT requires is to reduce the amount of data used to define a given color space and to provide on-line digital processing that linearly interpolates between adjacent data points (nodes) of the LUT. A piece-wise linear interpolation procedure, however, only approximates a higher-order non-linear function of the kind descriptive of color spaces actually employed.

FIG. 1(a), for example, shows an error ($\epsilon$) between the actual values of a non-linear function and corresponding linearly interpolated values; more specifically, FIG. 1(b) illustrates an error, over the interval $x=0$ to $x=1$, between actual values of the cubic function, $x^3$, and linearly interpolated values derived from a LUT defining the cubic at equally spaced nodes $x=\{0, 0.2, 0.4, 0.6, 0.8, 1.0\}$. Although the error is zero at each node, it has local maxima at points midway between adjacent nodes and is always negative at points between the nodes. In other words, an error, defined by the difference between actual values of a non-linear function and linearly interpolated values derived from the LUT, is biased.

SUMMARY OF THE INVENTION

In view of the foregoing, an object of the invention is to construct, for color image reproduction apparatus, a digitally operated look-up table (LUT) in which recorded table values, representative of useable image information in a given color space, provide an average error of zero (unbiased) for linearly interpolated image values in that color space. This object is achieved by recording table values that are altered from exact image values by means of a least squares algorithm.

For a LUT of a given size (number of recorded values) derived via a least squares algorithm, image values are more accurate in the sense that, in the aggregate, the average error between an exact image value and a value derived from the LUT, is zero. In other words, a more accurate piece-wise linear approximation to a continuous non-linear function has been achieved, without resorting to increasing LUT capacity.

This advantage, as well as other advantages of the invention, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1A:
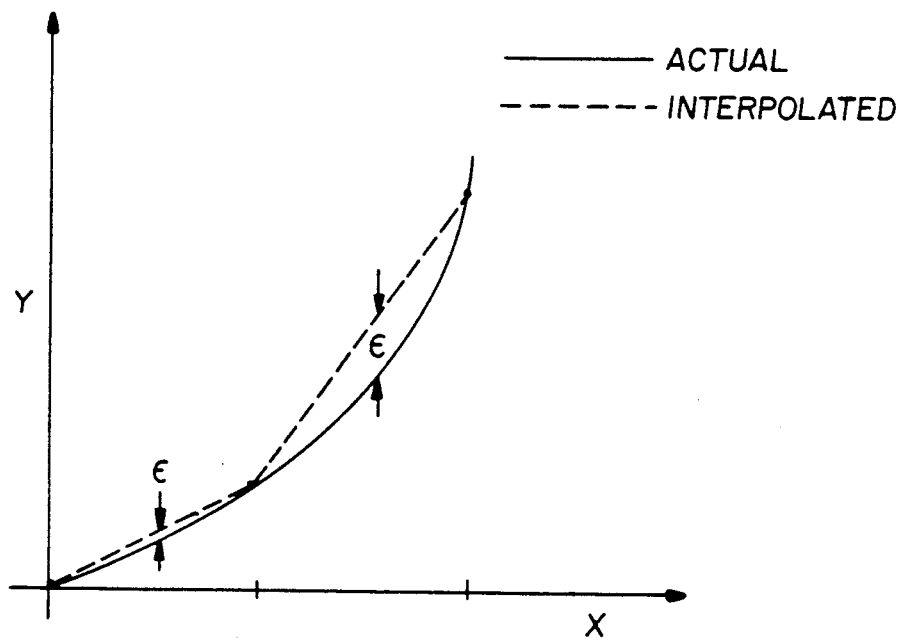
FIGS. 1(a) and 1(b) are graphs illustrating a disadvantage of a digitally operated look-up table (LUT) constructed according to the prior art.
Figure 1B:
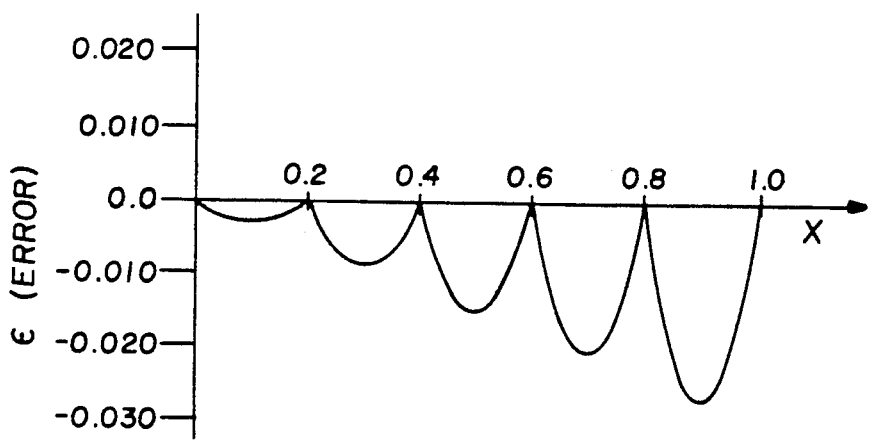
Figure 2A:
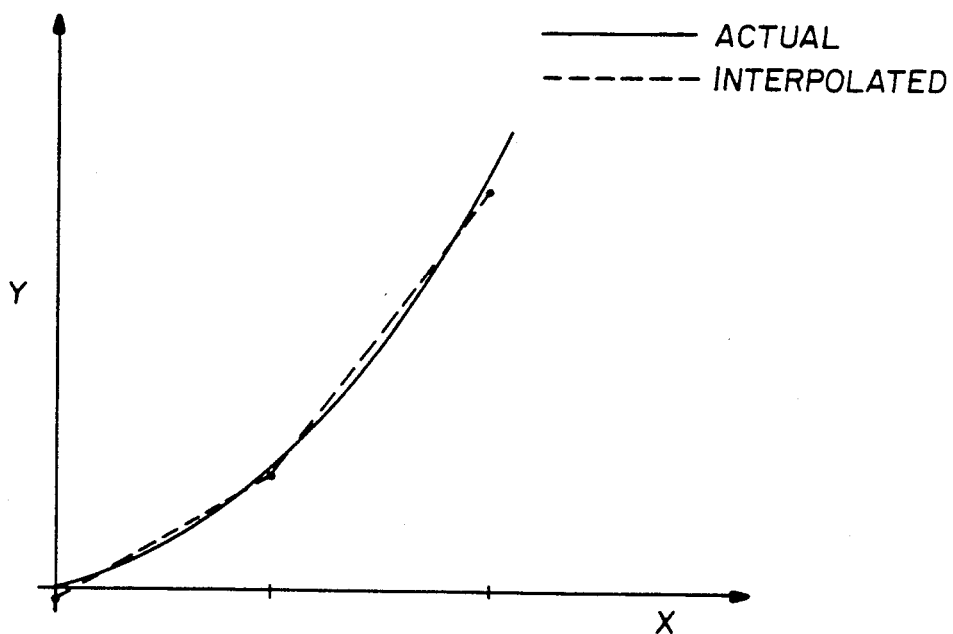
FIGS. 2(a) and 2(b) are graphs, similar to FIGS. 1(a) and 1(b), illustrating improved performance of a digitally operated LUT constructed in accordance with the present invention.
Figure 2B:

An object of the invention is to construct a digitally operated look-up table (LUT) in which recorded table values, for effecting a multivariate non-linear transformation, provide an unbiased error for linearly interpolated values. By way of example, and without limitation, FIG. 2(a) illustrates generally an unbiased error between actual values of a non-linear function and corresponding linearly interpolated values derived from a discrete representation of the same function; FIG. 2(b) is a plot of an unbiased error for dependent values derived from a LUT storing the aforementioned cubic function $y=x^3$, at $x=0$, 0.2, 0.4, 0.6, 0.8, and 1.0. Both FIGS. 2(a) and 2(b) illustrate that the errors (the difference between true values for the non-linear function and corresponding linearly interpolated values) are now both positive and negative. For that to be the case, FIG. 2(b) also shows that the nodal values for the dependent variable y (the table values for y over the interval $x=0$ to $x=1$) are altered from the true values (defined by $y=x^3$).

Since it will be useful later on in describing a least squares algorithm used, in accordance with the invention, for modifying the dependent nodal values to produce an unbiased error, consideration will first be given to the way in which linear interpolation is achieved. To that end, consider generally a simple one-dimensional LUT with nodes $x_i$ for the independent variable and nodes $b_i$ for corresponding values of the dependent variable, where i is a positive integer 1, 2, 3, -----.

Interpolation is a simple matter of determining within which cell of a LUT a particular value, $x_p$, for the independent variable falls, e.g. $x_j \leq x_p \leq x_{j+1}$. The term "cell" as used herein shall mean and refer to the "region" between and including an adjacent pair of nodes for the independent variable, e.g. $(x_{i-1}, x_i)$, $(x_i, x_{i+1})$, etc.

The extent to which $x_p$ "penetrates" its resident cell, denoted $s_p$, is computed from:

$$s_p = (x_p - x_j)/(x_{j+1} - x_j)$$

A linear interpolation, to find the dependent variable $y_p$ corresponding to $x_p$, is computed from:

$$y_p = b_j + (b_{j+1} - b_j)s_p \text{ or}$$

$$y_p = (1 - s_p)b_j + s_p b_{j+1}$$

where $b_j$ is the nodal value from the LUT for the dependent variable corresponding to $x_j$.

Accordingly, interpolation within a cell of a one-dimensional LUT is simply a linear combination of nodal values of the LUT defining the boundary for that cell, the node at the right boundary of the cell being weighted by the "depth-of-penetration" $s_p$ and the node at the left boundary being weighted by $(1 - s_p)$.

The technique of linear least squares serves to generate a LUT in which the dependent variable of the LUT, when interpolating between neighboring dependent values in the table, has an average error of zero. To that end, the problem under consideration, i.e. generating an "unbiased" LUT, can be modeled in the linear form $$Y = S\beta + \epsilon$$

where
Y is an $(n \times 1)$ vector of known observations of the dependent variable,
$\beta$ is a $(w \times 1)$ vector of the independent variable,
S is an $(n \times w)$ matrix representing the penetration of the w values of the independent variable into their corresponding cells, and
$\epsilon$ is an $(n \times 1)$ error vector.

The error sum of squares can be written as:

$$\begin{aligned} \epsilon' \cdot \epsilon &= (Y - S\beta)'(Y - S\beta) \\ &= Y'Y - \beta'S'Y - Y'S\beta + \beta'S'S\beta \\ &= Y'Y - 2\beta'S'Y + \beta'S'S\beta \end{aligned}$$

since $\beta'S'Y = Y'S\beta$.

The least squares estimate of $\beta$ is the value of a vector b, which when substituted for the vector $\beta$ (or $\beta'$) in the above equation, minimizes $\epsilon' \cdot \epsilon$. The vector b is determined by differentiating $\epsilon' \cdot \epsilon$ with respect to $\beta$, and setting the resultant matrix equation equal to zero.

In mathematical form, $$\left. \frac{\partial \epsilon' \cdot \epsilon}{\partial \beta} \right|_{b=\beta} = 0 = -2S'Y + S'S\beta + \beta'S'S$$

$$\left. \frac{\partial \epsilon' \cdot \epsilon}{\partial \beta} \right|_{b=\beta} = 0 = -2S'Y + 2S'S\beta$$

since $S'S\beta$ and $\beta'S'S$ are equivalent. Substituting the vector b for $\beta$ leads to the normal equations $$(S'S)b = S'Y \qquad (1)$$

or $$b = (S'S)^{-1} S'Y$$

The elements of b are linear functions of the dependent observations $y_1, y_2, --- y_n$ and provide unbiased estimates of the (w×1) vector of independent parameters $\beta$.

The technique of linear least squares, in accordance with the invention, is illustrated by way of example for a simple one-dimensional LUT. To that end, a LUT having independent nodes at x={0.0, 0.2, 0.4, 0.6, 0.8, 1.0} is to be built for the underlying function $y=x^3$. The values for the corresponding dependent nodes are to provide an unbiased estimate for linearly interpolated values.

For this purpose, data are needed relating the dependent variable y to the independent variable x. In this case, the function is known so that data relating the independent and dependent variables can be computed simply and directly from $y=x^3$. (If this hypothetical problem concerned an unknown function, for example determining the functional relationship between two different color spaces, corresponding data representing input and output color spaces would be derived empirically from color test strips.)

Assume that the following ten (x, y) pairs of data are generated:

| x | $y = x^3$ |
|---|---|
| 0.03 | 0.000027 |
| 0.09 | 0.000729 |
| 0.22 | 0.010648 |
| 0.26 | 0.017576 |
| 0.32 | 0.032768 |
| 0.40 | 0.064000 |
| 0.57 | 0.185193 |
| 0.70 | 0.343000 |
| 0.88 | 0.681472 |
| 0.92 | 0.778688 |

In other words, Y, the (n×1) vector of observations, consists of n=ten (10) observations.

Relating the ten corresponding observations of x to the six independent nodes selected for the LUT, e.g. x=0, 0.2, 0.4, 06, 08, 1.0, the matrix S, corresponding to the aforementioned cell "penetration", is calculated to be of the form:

$$S = \begin{bmatrix} 0.85 & 0.15 & 0 & 0 & 0 & 0 \\ 0.55 & 0.45 & 0 & 0 & 0 & 0 \\ 0 & 0.90 & 0.10 & 0 & 0 & 0 \\ 0 & 0.70 & 0.30 & 0 & 0 & 0 \\ 0 & 0.40 & 0.60 & 0 & 0 & 0 \\ 0 & 0 & 1 & 0 & 0 & 0 \\ 0 & 0 & 0.15 & 0.85 & 0 & 0 \\ 0 & 0 & 0 & 0.50 & 0.50 & 0 \\ 0 & 0 & 0 & 0 & 0.60 & 0.40 \\ 0 & 0 & 0 & 0 & 0.40 & 0.60 \end{bmatrix}$$

Knowing S and Y, the vector b, the least squares estimates for the dependent variable $b_i$ corresponding to $x_i$=0, 0.2, 0.4, 0.6, 0.8, 1.0, is computed from equation (1) and is found to be:

| $x_i$ | $b_i$ | $y(x_i) = x^3$ |
|---|---|---|
| 0.0 | 0.00013 | 0.0 |
| 0.2 | 0.00148 | 0.008 |
| 0.4 | 0.05824 | 0.064 |
| 0.6 | 0.20695 | 0.216 |
| 0.8 | 0.48093 | 0.512 |
| 1.0 | 0.97876 | 1.0 |

The true values of the cubic $x^3$ are included in the third column for comparison with the corresponding values of $b_i$. Note that the dependent variable $b_i$ has values that are different from the exact values for the cubic.

The above dependent parameters $b_i$, obtained by least squares of ten pairs of data points, tend to provide an average error of zero (FIGS. 2(a) and 2(b)) when interpolating between neighboring dependent values. In actuality, many additional pairs of data points would generally be used, thus resulting in an overall error that is more clearly unbiased.

Figure 3:
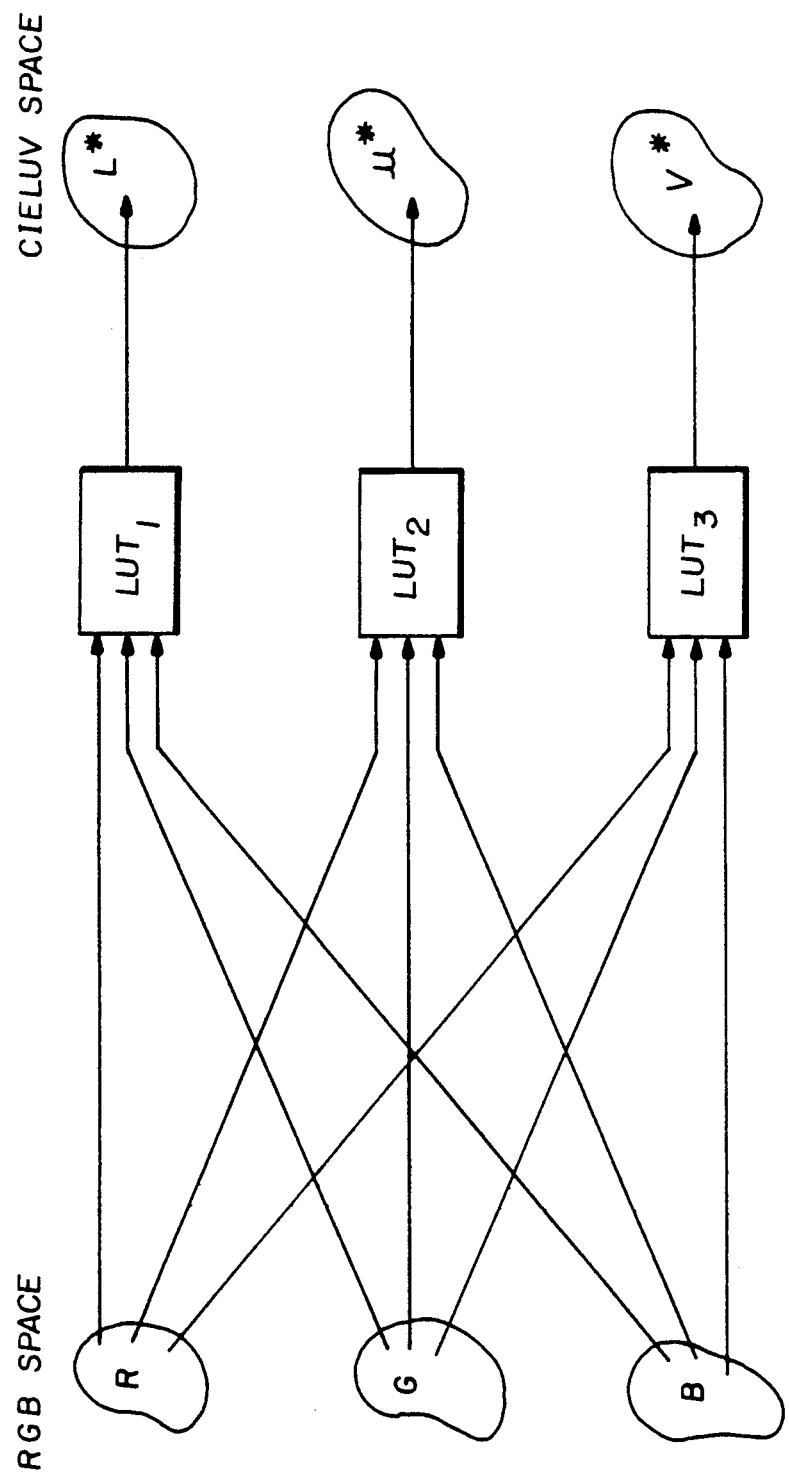
FIG. 3 illustrates the use of one of more LUTs for transforming image data in one color space to data representing the same image in a different color space.

In a preferred embodiment of the invention, a LUT functions to transform a set of color imaging data (multiple independent variables) in one color space to a corresponding set of color imaging data (multiple dependent variables) in a different color space. For example, by mixing three sources (independent variables)—a red, a green, and a blue—almost any spectrum color (dependent variable) can be obtained. FIG. 3 shows, for example, that by means of multiple LUTs, input signals corresponding to R, G, B can be transformed mathematically to arrive at CIELUV output signals L*, u*, and v*.

It will be understood by those skilled in the art, however, that the number of independent variables need not be the same as the number of dependent variables. It will also be understood that multiple LUTs can be used in the reverse direction to transform input signals corresponding to L*, u*, and v* to output signals corresponding to R, G, and B.

As referred to previously herein, the specifications for patches of material in a given color space (device independent or dependent) are commonly derived via measurement and calculation using color test strips. Having the specifications for an input color space, for example RGB, and corresponding specifications for an output color space, for example CIELUV (L* u* v*), the transform or functional relationship between the two color spaces can then be defined. There is a variety of publications relating to the transforming of imaging data in one color space to imaging data in another color space. See, for example, THE REPRODUCTION OF COLOUR IN PHOTOGRAPHY, PRINTING AND TELEVISION, R. W. G. Hunt, published 1987 by Fountain Press.

Figure 4:
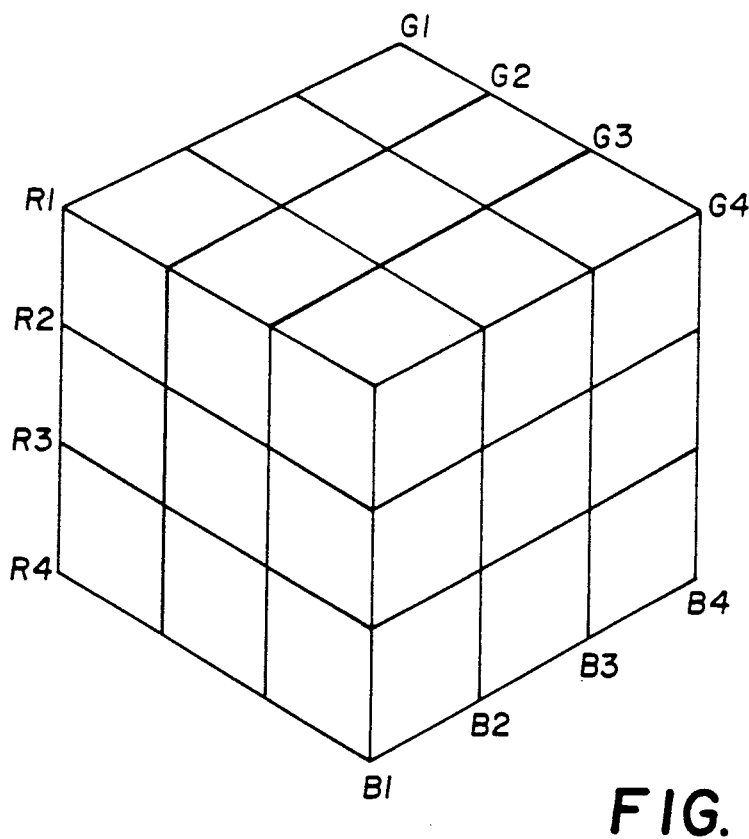
FIG. 4 illustrates a 3-dimensional LUT.

When mapping between multivariant functions, the case for transforming between color spaces, individual cells of a LUT may be viewed as a multi-dimensional grid, the number of dimensions being equal to the number of independent variables. FIG. 4, for example, shows a 3-dimensional grid, with four nodes or addresses for each dimension. Each address in the grid has associated with it a triplet of numbers (64 triplets for a 4x4x4 grid) representing a particular combination of independent function values, for example red (R), green (G), and blue (B) transmittance values. Similarly, each address in the grid has associated with a value for a particular dependent variable—L*, u* or v* for the CIELUV color space. Alternatively, each address in the grid may have associated with it multiple values representing a like multiple of dependent values of the LUT, for example, L*, u* and v*. In the latter case, the transformation of RGB to L*, u*, v* (FIG. 3) could be represented by a single LUT.

The use of a multi-dimensional LUT is much the same as described previously for a one-dimensional LUT. For a three-dimenisonal LUT, linear interpolation is accomplished, as before, by first determining the cell of the LUT in which the value of each independent variable resides, e.g.

$$R_i \leq R_P \leq R_{i+1}$$

$$G_j \leq G_P \leq G_{j+1}$$

$$B_k \leq B_P \leq B_{k+1}$$

For each independent variable, the depth of cell penetration, $S_p$, is computed as before:

$$S_{RP}=(R_P-R_i)/(R_{i+1}-R_i)$$

$$S_{GP}=(G_P-G_j)/(G_{j+1}G_j)$$

$$S_{BP}=(B_P-B_k)/(B_{k+1}-B_k)$$

Figure 5:
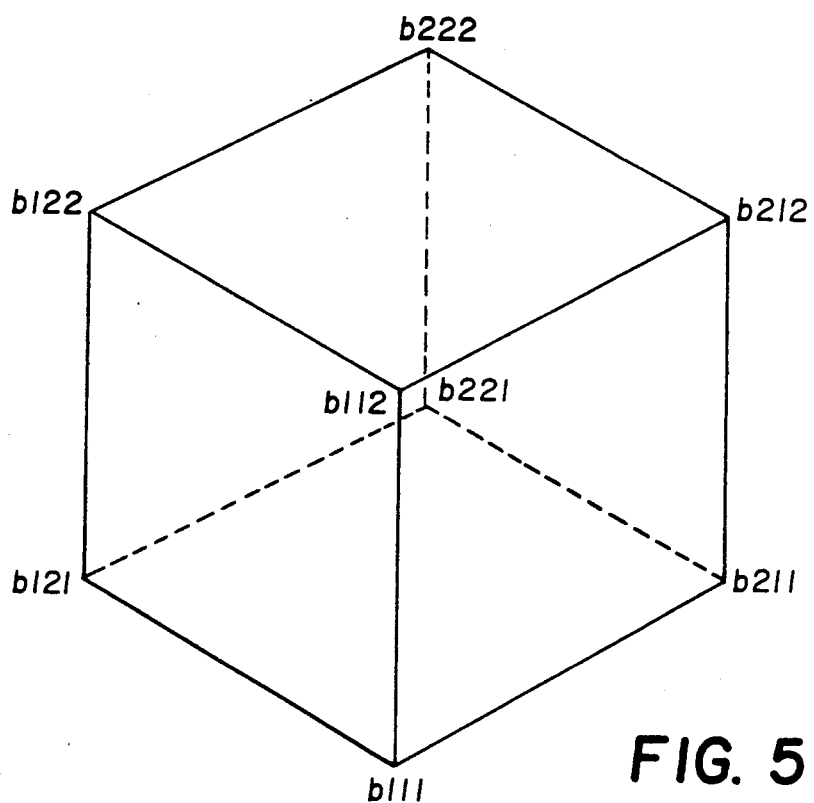
FIG. 5 illustrates a single cell of a 3-dimensional LUT.

FIG. 5 illustrates that a resident cell of a 3-dimensional LUT—the cell containing each of the three values of a given triplet—may be normalized, and, in so doing, defined at its eight corners by $b_{111}, b_{211}, ---b_{222}$. A linear interpolation to find, for example the dependent variable $L_P^*$ (or $u_P^*$ or $v_P^*$), corresponding to the independent variables $R_P, G_P, B_P$, is computed from:

$$\begin{aligned}F_p(L^*) = &\ (1-S_{Rp})(1-S_{Gp})(1-S_{Bp})\,b_{111}\ + \\ &\ S_{Rp}(1-S_{Gp})(1-S_{Bp})\,b_{211}\ + \\ &\ (1-S_{Rp})S_{Gp}(1-S_{Bp})\,b_{121}\ + \\ &\ S_{Rp}S_{Gp}(1-S_{Bp})\,b_{221}\ + \\ &\ (1-S_{Rp})(1-S_{Gp})S_{Bp}\,b_{112}\ + \\ &\ S_{Rp}(1-S_{Gp})S_{Bp}\,b_{212} + (1-S_{Rp})S_{Gp}S_{Bp}\,b_{122}\ + \\ &\ S_{Rp}S_{Gp}S_{Bp}\,b_{222}\end{aligned}$$

Note $S_{RP}, S_{GP}$, and $S_{BP}$ all lie, as with a 1-dimensional LUT, between 0 and 1, and thereby $(1-S_{RP})$, etc. also always fall within the interval 0 to 1. Accordingly, except for the additional terms, an S matrix for a multidimensional case is constructed in a manner similar to that of a 1-dimensional LUT.

For the general case of constructing a 3-dimensional LUT for transforming RGB to a different color space, the 2-dimensional matrix S is of a size $$n \times (m_R\, m_G\, m_B)$$

where n is the number of corresponding pairs of known observations between RGB and a dependent variable RGB is to be transformed to, and $m_R, m_G,$ and $m_B$ are the number of addresses of the LUT selected for R, G, and B, respectively.

Figure 6:
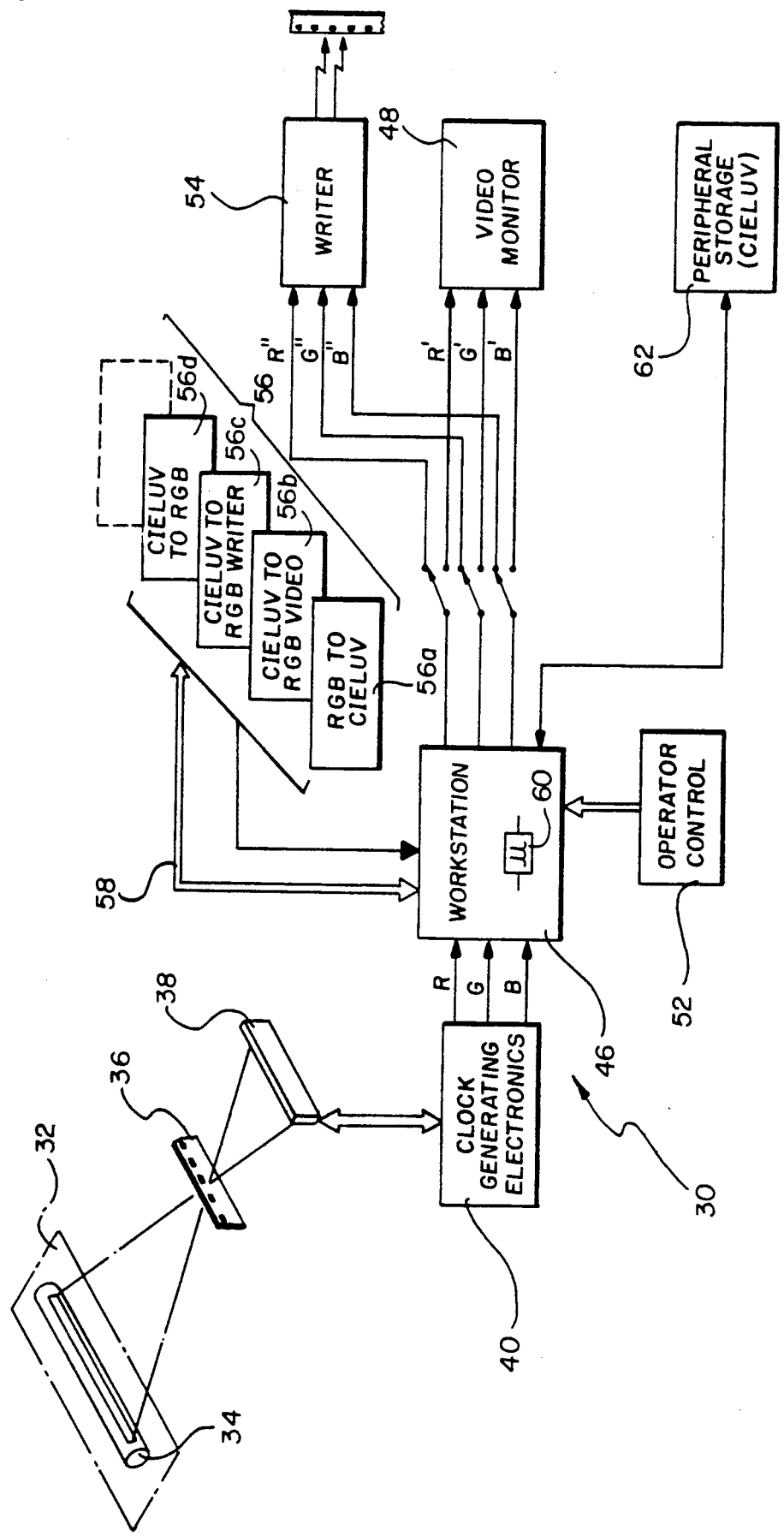
FIG. 6 is a block diagram of color imaging apparatus that utilizes multiple LUTs, constructed in accordance with the invention, for transforming digital color image data between multiple color spaces.

FIG. 6 shows, in block diagram form, color imaging apparatus 30 that permits an operator to edit the color and composition of an original photographic image to produce an aesthetically modified image. To that end, the imaging apparatus 30 employs a variety of LUTs, constructed in accordance with the teachings of the present invention, for transforming image data in one color space to data representing the same image in a different color space.

An image scanner 32, having a light source 34 defining preferably a line of diffuse illumination, serves for scanning an image on a sheet of photographic film 36. For that purpose, the film 36 is mounted on a movable drum table or the like (not shown) for stepwise movement in a line scan direction, preferably under the influence of a stepper motor (also not shown).

A charge coupled device (CCD) linear image sensor 38, arranged to receive a line of light modulated in accordance with the film image, includes an overlay comprising three parallel arrays of color filters—red (R), green (G), and blue (B). This "tri-linear" image sensor 38 further includes three corresponding parallel output registers which are coupled, respectively, to an output of one of the color filter arrays. Thus, the output of one of the registers corresponds to an R video signal, a second register to a G video signal, and the third register to a B video signal.

Clock generating electronics 40 serves to control the CCD sensor 38 and to process its output signals to produce in a known manner a high-resolution video signal corresponding to the film image. The clock generating electronics 40 applies R, G, and B signals in digital form to a microprocessor-based workstation 46 for subsequent operations, such as editing the image and to provide a composite video signal for displaying the reproduced image on a video monitor 48.

A tri-linear image sensor array and corresponding clock generating electronics of the type disclosed herein are the subject of U.S. Pat. No. 4,278,995 entitled COLOR LINE SENSOR FOR USE IN FILM SCANNING APPARATUS, assigned to the assignee of this invention and the disclosure of which is incorporated herein by reference.

The microprocessor-based workstation 46 enables an operator to modify (color and/or composition) the digital signal image. To that end, the video monitor 48, which includes a frame store and a digital to analog (D/A) converter, serves to display an image corresponding to R" G" B" signals provided by the workstation 46. Operator control apparatus 52, preferably including a keyboard and a mouse or tablet, enables an operator to interact with the workstation 46 to provide input information such as film type and film size and to provide image-manipulation commands pertinent to modifying the image displayed. An interactive workstation of this general type may be obtained from Sun Microsystems Inc., Mountain View, Ca.

The workstation 46 preferably stores a representation of the image in a perceptually based color space. The aforementioned CIE 1976 (L* u* v*) color space, commonly called CIELUV, is suitable for that purpose.

The workstation 46 also has available to it color imaging data in R' G' B' space for driving a film writer 54 which preferably is of the type disclosed in U.S. Pat. No. 4,631,551, assigned to the assignee of the present invention.

For accomplishing its functions, the workstation 46 has associated with it a bank of storage devices 56 that individually serve as a digitally operated LUT for transforming image data in one color space to data representing the same image in a different color space. A first LUT 56a, for example, serves to transform original RGB image data, generated by the image sensor 38, to CIELUV image data; LUTs 56b and 56c function, respectively, to transform CIELUV data to RGB video and RGB writer data, in accordance with the sensitivities of the monitor 48 and the writer 54 to their respective drive signals. A LUT 56d serves to transform CIELUV data to RGB space.

The transformations to be made are each a function of the particular photographic film employed (the film type read by the scanner 32 and the film type written onto by the writer 54). Accordingly, additional LUTs, only one of which is shown in phantom, are provided for each film type employed for converting from the appropriate RGB color space to CIELUV or vice versa.

To convert image data into a desired color space, the workstation 46, by means of a LUT select line 58, retrieves "transform" data from the appropriate LUT. One or more processing devices, denoted by a microprocessor 60, perform, under program control, both logic operations to retrieve data values from the correct addresses of the LUT selected and arithmetic operations for linear interpolation on the values retrieved.

When a desired image has been composed on the video monitor 48, an operator may make a machine-readable record of the image composed. To that end, a peripheral storage device 62, such as a magnetic tape or magnetic disk, functions to record image-bearing signals, preferably in CIELUV space, corresponding to the final image composed.

LUTs, in accordance with the present invention, are constructed "off-line", as part of the manufacturing and assembly of a presently preferred embodiment of color imaging apparatus. To that end, a solid state read-only memory (ROM) or a magnetic disk serves as a suitable storage device for each LUT constructed.

There are two factors to be considered initially in the construction of a LUT of a given capacity. The first concerns the space between neighboring values of a given variable. The number of nodes (or cells) actually used, i.e. LUT capacity, is determined, among other things, by the accuracy requirement of the LUT and the storage space available.

Figure 7:
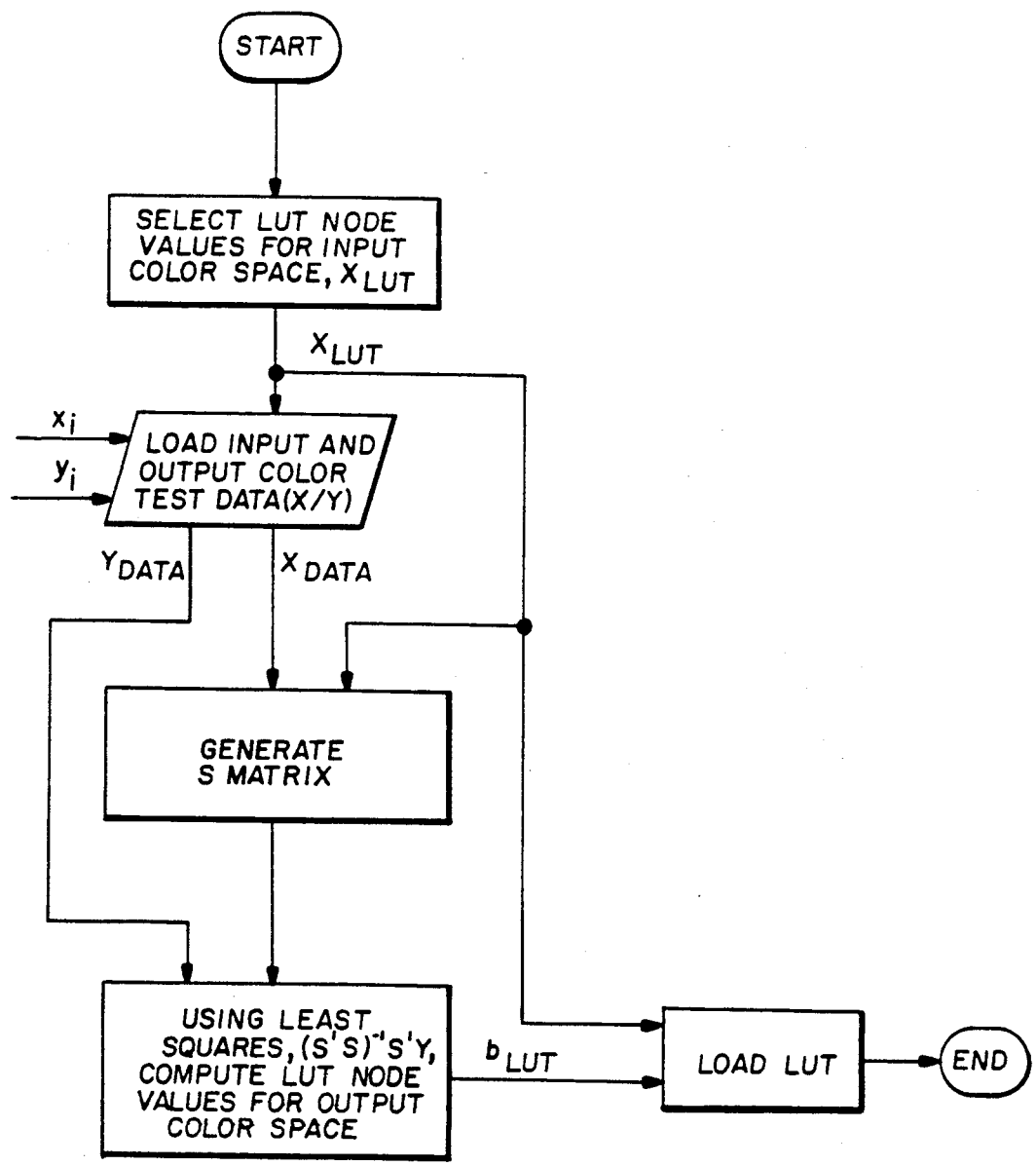
FIG. 7 is a flowchart illustrating the construction of a LUT by means of a least squares algorithm.

A second factor in the construction of a LUT is the values to be assigned to each dependent variable based on the values of the independent variables selected. FIG. 7 illustrates generally, in flowchart from the manner in which a linear least squares algorithm is employed in computing the values for the set of dependent variables to be entered into each LUT.

First, the number of independent nodes and the signal values for such nodes are selected. A particular advantage of my invention is that the values selected for a given independent variable need not be equally spaced. Accordingly, in regions where a dependent variable is changing more rapidly with changes in a given independent variable, the spacing between adjacent nodes can be smaller to reduce localized interpolation errors.

FIG. 7 also shows that the functional relationship between two color spaces is determined by using laboratory test data. For example, a densitometer functions for reading R, G, and B density values from color test strips; spectrophotometric methods, known in the art, serve to provide the data needed to calculate corresponding L*, u*, and v* values. Generally, the larger the set of off-line data values, the greater the accuracy of the LUT to be constructed.

After the off-line data relating different color spaces are correlated, the aforementioned S matrix is computed, based on the node values selected for each independent variable; then, corresponding node values for each dependent variable are computed, as a function of the S matrix and the matrix Y of observations (test data) of the dependent variable, e.g. $(S'S)^{-1}S'Y$.

The invention has been described in detail with reference to the figures; however, it will be appreciated that variations and modifications are possible within the spirit and scope of the invention.

What is claimed is:

1. In imaging apparatus including an input device adapted to produce a multivariate signal representing an input image, a multi-dimensional look-up table storing a set of discrete multivariate signal values and a corresponding set of discrete non-linearly related reproduction signal values representative of useable output image information, and electronic computer means coupling said input device and said look-up table, for linearly interpolating between neighboring multivariate signal values in said look-up table in accordance with an actual multivariate signal provided by said input device, to compute a reproduction signal relating to an output image actually to be used, wherein the improvement comprises:

the discrete reproduction signal values in said look-up table are altered by means of a least squares algorithm from exact values defined by the aforementioned non-linear relationship, to cause the average error, in the reproduction signal values computed, to be zero when interpolating between neighboring multivariate signal values in said look-up table.

2. In image composition apparatus including a scanner for scanning a photographic film to produce a tristimulous signal representative of colors in the film, a 3-dimensional look-up table storing a set of discrete tristimulous signal values and a corresponding set of discrete reproduction signal values related in a non-linear manner to the set of tristimulous signal values and representative of colorants to be recorded on a particular photosensitive medium, and electronic computer means, coupling said scanner and said look-up table, for linearly interpolating between neighboring tristimulous signal values in said look-up table as a function of an actual tristimulous signal produced by said scanner, to compute a reproduction signal relating colors in the film to colorants actually to be recorded on the photosensitive member, wherein the improvement comprises:

the discrete reproduction signal values in said look-up table having respective values that are altered by means of a least squares algorithm from exact values defined by the aforementioned non-linear relationship, to drive the average error, between the reproduction signal values computed and exact reproduction signal values, to zero when interpolating between neighboring tristimulous signal values in said look-up table.

* * * * *

UNITED STATES PATENT AND TRADEMARK OFFICE
CERTIFICATE OF CORRECTION

PATENT NO. : 4,992,861
DATED : February 12, 1991
INVENTOR(S) : John D'Errico It is certified that error appears in the above-identified patent and that said Letters Patent is hereby corrected as shown below:

Column 10, line 51     delete "having respective values that".

Signed and Sealed this

Twenty-third Day of June, 1992

*Attest:*

*Attesting Officer*

DOUGLAS B. COMER

*Acting Commissioner of Patents and Trademarks*